May 26, 1964  B. LONG  3,134,660
APPARATUS FOR MAKING SHEET GLASS
Filed Oct. 27, 1960  2 Sheets-Sheet 1

Bernard Long
*INVENTOR.*

BY

*Karl F. Ross*
AGENT.

May 26, 1964     B. LONG     3,134,660

APPARATUS FOR MAKING SHEET GLASS

Filed Oct. 27, 1960     2 Sheets-Sheet 2

Bernard Long
*INVENTOR.*

BY

*Karl F. Ross*
AGENT.

3,134,660
APPARATUS FOR MAKING SHEET GLASS
Bernard Long, Paris, France, assignor to G.B.D. Societe Anonyme Holding, Luxembourg, a corporation
Filed Oct. 27, 1960, Ser. No. 65,533
Claims priority, application France Oct. 30, 1959
3 Claims. (Cl. 65—157)

My present invention relates to an apparatus for producing sheets or strips of flat glass by drawing a vitreous material from a molten bath.

In my co-pending application Ser. No. 793,442, filed February 16, 1959, now Patent No. 3,000,142, issued September 19, 1961, of which the present application is a continuation-in-part, I have disclosed a process for producing sheet glass whereby a molten mass of vitreous material enters a drawing chamber and is cooled therein in a controlled manner so as to produce a first viscous skin on the upper surface of the bath and a second viscous skin on the lower surface of the melt in contact with the floor of the drawing chamber. The two viscous skins, upon cooling, give rise to a pair of relatively tough membranes or layers between which a quantity of liquid glass is sandwiched as the sheets are drawn. The most effective membrane-forming process was described as one in which the upper and lower surfaces of the melt were cooled at such a rate that the temperature gradients of the surfaces along the chamber were substantially equal and in excess of 100° C. per linear meter. The formation of a lower viscous layer was shown to accelerate the production of sheet glass by creating a pair of parallel-moving films between which an entrained vitreous mass of greater fluidity could be withdrawn at high speed without causing surface irregularities in the finished sheet.

In my co-pending application Ser. No. 12,635, filed March 3, 1960, I disclose a method of and apparatus for further accelerating the production of sheet glass. In the latter application, the floor of the drawing chamber is shown to be provided with an anti-fricton layer of molten metal adapted to reduce the frictional resistance between the glass flow and its support.

It is the principal object of my present invention to provide an apparatus for drawing flat glass, as generally disclosed in my above-mentioned co-pending applications, adapted still further to reduce the frictional resistance between the molten vitreous mass and the drawing chamber to accelerate production.

Another object of the present invention is to provide means for reducing the frictional resistance along the lateral retaining walls of the drawing chamber as well as along the floor thereof.

According to a feature of the invention, the refractory wall surfaces of the feeding trough and the drawing chamber of an apparatus for making flat glass are provided with a lining of a material whose coefficient of friction is substantially less than that of the refractory walls and which is not wettable or only slightly wettable by molten glass. The layer should consist of substances incapable of reacting with the vitreous mass even at elevated temperatures, i.e. under the conditions prevalent in the drawing chamber, so as not to modify the composition of the glass. The friction-reducing layer may line the lateral retaining and end walls of the chamber as well as the floor thereof.

As these terms are used in the present disclosure, a globule of liquid glass does not wet a solid surface contacting this globule when the angle of contact is greater than 90° measured on the side where the glass contacts the solid surface. If this angle is slightly less than 90°, the solid surface is only slightly wetted by the glass. Both of these conditions are encompassed by the term "substantially non-wettable."

The anti-friction lining may comprise a graphitic layer covering the glass-retaining walls and the floor of the drawing chamber, which is not wetted by liquid glass. The graphitic lining, preferably in the form of relatively inexpensive and readily manufactured slabs, effectively reduces the frictional resistance to the displacement of liquid glass and of the solidifying glass membranes at the upper and lower surfaces of the vitreous bath through the drawing chamber. I have found that this material will not react objectionably with the vitreous mass, and will not give rise to gases capable of altering the physical characteristics or the coloration thereof, if the impurity level of the graphite slabs is carefully controlled. Accordingly, the slabs should not contain impurities in excess of 0.3% by weight, while specifically the quantities of titanium oxide and iron oxide should be less than 0.05%. Graphite slabs of such high purity are currently available commercially.

These slabs have been found to be substantially non-reactive at the temperatures prevalent along the floor of the drawing chamber, which is generally cooled to maintain a temperature in the vicinity of 900° C., as well as along the uncooled lateral walls where the temperature may range up to 1100° C.

According to a more specific feature of the invention, the graphite layer is not permitted to come into contact with the oxygen-containing ambient atmosphere in order to prevent oxidation and, consequently, deterioration of the slabs. The slabs may, for example, be fully submerged below the level of the liquid glass to a depth so slight that the top layer of the liquid glass, which thus contacts directly the refractory blocks of the dischage-chamber structure above and behind the graphite slabs, will experience only a minor increase in frictional resistance. For a maximum reduction of the frictional resistance, the level of the liquid glass in the chamber is maintained somewhat below the tops of the slabs lining the lateral walls thereof to eliminate all direct contact between the lateral surfaces of the melt and the refractory chamber walls. The free or exposed surfaces of the slabs are then bathed in an oxygen-free atmosphere (e.g. nitrogen or carbon dioxide) to minimize the possibility of atmospheric oxidation of the slabs.

The need for a protective atmosphere can be avoided if the graphite is replaced by a non-carbonaceous friction-reducing layer consisting, for example, of a ceramic mixture composed mainly of vanadium oxide ($V_2O_5$) and aluminum oxide ($Al_2O_3$). A particularly suitable ceramic anti-friction layer comprises the ceramic mixture marketed under the trade name Vanal which contains 34% $Al_2O_3$ and 64% $V_2O_5$. The layer may be applied to the refractory blocks constituting the inner surface of the drawing chamber as a coating of sufficient thickness to prevent contact between the liquid glass and the refractory blocks, or may be cast or molded to form slabs, similar in form to those of graphite previously described, and then positioned along the interior walls of the chamber. Under the temperature conditions generally maintained in the chamber, there is small risk of incorporation of traces of vanadium oxide in the glass melt so that no noticeable change of coloration occurs.

Another substantially inert anti-friction liner according to my invention may be a surface foil of a noble metal or alloy which does not adhere to glass under the temperature conditions of the drawing chamber. Platinum, for example, alloyed with one or more precious metals, e.g. "Platinum II," marketed by Degussa Hanau, is particularly suitable for lining the glass-contacting surfaces of a drawing chamber.

The above and other objects, features and advantages of my invention will become more readily apparent from the following description, reference being made to the accompanying drawing in which.

Figure 1:
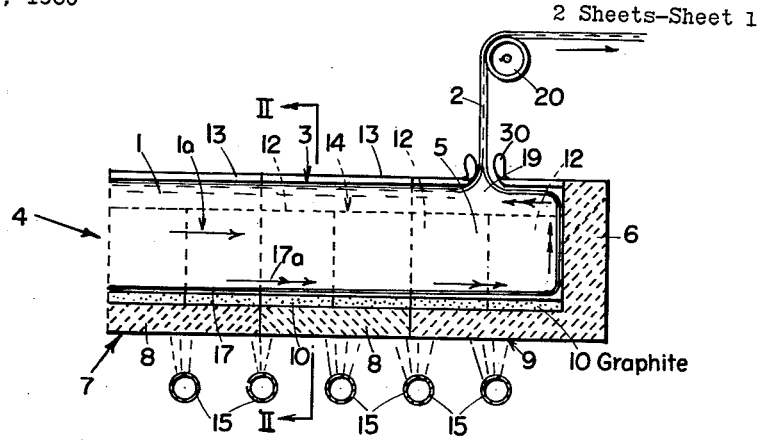
FIG. 1 is a longitudinal cross-sectional view of a sheetglass-drawing chamber according to the present invention.
Figure 2:
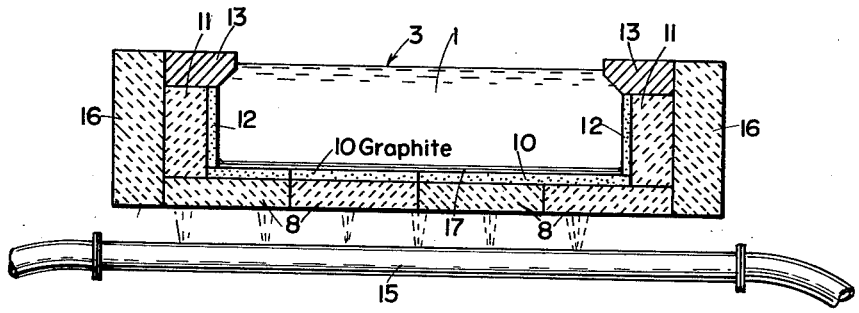
FIG. 2 is a cross-sectional view taken along line II—II of FIG. 1.

In FIGS. 1 and 2 I show a feeding trough 4 which supplies a drawing chamber 5 with a stream of liquid glass 1 from the interior of a tank furnace (not shown), as generally described in my aforementioned co-pending applications. The liquid glass 1 continuously moves in the direction of arrow 1a to feed the sheet 2 which is continuously drawn from the melt at the drawing chamber 5 over a roller 20 and between conventional cooling boxes 30.

The feeding trough 4 and the drawing chamber 5 are formed from contiguous bottom blocks 8, lateral blocks 11 positioned along the longitudinal sides of the chamber, and a terminal wall 6 which extends transversely to the longitudinal blocks 11 at the end of the drawing chamber to form a draw pot. The blocks are all of refractory material to withstand the high temperatures of the glass melt. The side blocks 11 abut outer walls 16 made of a thermally insulating material. The floor of feeding trough 4 and drawing chamber 5, formed by the blocks 8 which are preferably less than 10 cm. thick to facilitate heat transfer from the melt 1, are cooled by a spray of coolant from pipes 15 against the undersurfaces 7 and 9 of the feeding trough and the drawing chamber, respectively.

The interior surfaces of the blocks 8 and 11 are provided with a non-wettable layer in the form of graphite slabs 10 and 12, respectively, to which the liquid glass 1 does not adhere and which reduces frictonal resistance to the flow of the liquid glass in the direction of arrow 1a and to the displacement (arrow 17a) of the lower vitreous membrane 17 formed at the cooled floor of the trough and the chamber. The lateral graphite slabs 12 are disposed so that their upper extremities 14 are below the upper surface 3 of the glass in order to prevent oxidation and deterioration of the graphite. To prevent liquid glass from entering the interstice between the slabs 12 and the lateral blocks 11, I prefer to cover the upper edges 14 of the graphite slabs 12 with beveled blocks 13 of refractory material. The surface tension of the liquid glass in contact with the beveled portion of the blocks 13 prevents the flow of glass behind the slabs 12. Since the graphite slabs 12 are not wetted by the liquid glass, there is a substantial reduction in the frictional resistance to the stream of glass 1 along the lateral walls of the feeding trough 4 and the drawing chamber 5.

Figure 3:
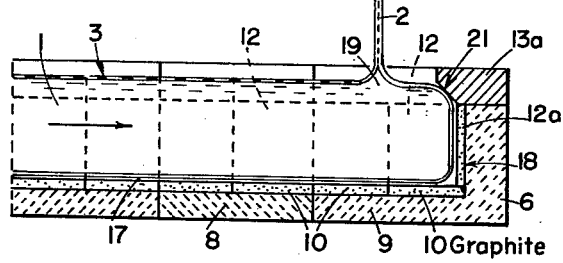
FIG. 3 is a view similar to FIG. 1 illustrating a drawing chamber provided with a fricton-reducing lining along its terminal wall.

In FIG. 3 I show a drawing chamber similar to that illustrated in FIGS. 1 and 2 wherein, however, the terminal wall 6, which the lower glass membrane 17 contacts as it is drawn upward to form the distal layer of the developing sheet 2, is provided on its inner surface 18 with a fricton-reducing layer constituted by graphite slabs 12a. The slabs 12a are covered by a refractory block 13a, as described with reference to slabs 12 and blocks 13, to prevent the flow of glass behind the slabs 12a. The beveled surface 21 of block 13a engages the rising glass membrane 17 to prevent exposure of the slabs 12a to atmospheric oxygen.

Figure 4:
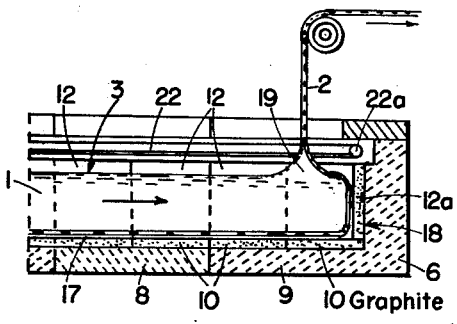
FIGS. 4, 5 and 6 are views similar to FIG. 3 but showing other terminal-wall linings.

FIG. 4 shows a drawing chamber and a feeding trough, similar to those previously described, wherein the slabs 12 and 12a extend above the surface of the liquid glass 1 and the protective blocks 13 and 13a have been dispensed with. A plurality of pipes 22 and 22a, preferably of inert and refractory material (e.g. hardened porcelain or silicon carbide), are arranged about the perimeter of the bath for the admission of a pre-heated non-oxidizing gas (e.g. nitrogen) which blankets the exposed portions of graphite slabs 12 and 12a to prevent oxidation thereof. The heated gas streams are advantageously directed against the inner walls of the trough and the chamber.

Figure 5:
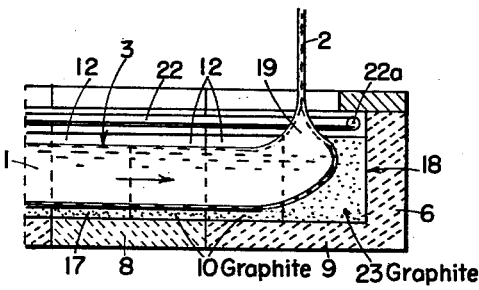

The linings 12a of the terminal wall 6 of the draw pot (FIGS. 3 and 4) have been replaced in FIG. 5 with a graphite block 23 shaped to divert the lower membrane 17 of glass gradually upwardly where it joins the surface membrane 3 at 19 to form the sheet 2. The bends of almost 90° of the lower membrane 17 as the latter rises abruptly at the terminal wall 6, as illustrated in FIGS. 1, 3 and 4, may produce undulations in the surface of sheet 2 formed by membrane 17 which are obviated when the membrane is diverted upwardly in a gradual manner as shown in FIG. 5.

Figure 6:
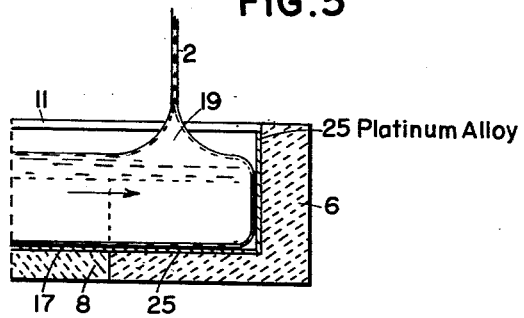

In FIG. 6 I show the blocks 6, 8 and 11 of the masonry constituting the chamber structure provided with an inner lining 25 of a platinum-alloy foil which is not wetted by the liquid glass 1. It will be noted that the protective blocks 13, 13a (FIGS. 1–3) and the protective atmosphere introduced via pipes 22, 22a (FIGS. 4 and 5) are not necessary in view of the non-oxidizing and inert character of the foil.

I claim:

1. In an apparatus for the production of flat glass including an elongated horizontal trough of refractory material forming an upwardly open channel of constant depth for the flow of molten glass, said channel having a terminal portion provided with means for drawing a glass sheet in upward direction from two relatively viscous vitreous membranes respectively formed at the top and at the bottom of the channel, the combination therewith of a graphite layer covering the floor of said trough, and cooling means underneath said trough for directing a cooling fluid against the underside of said floor, thereby promoting the formation of the lower one of said membranes in a stratum of said flow directly above said graphite layer.

2. The combination defined in claim 1 wherein said trough has lateral walls lined internally with further graphite layers up to a level near the top of said channel.

3. The combination defined in claim 1, further comprising supply means near the top of said trough for admitting a nonoxidizing gas to said channel above the flow level.

References Cited in the file of this patent

UNITED STATES PATENTS

| 1,453,842 | Jacobs | May 1, 1923 |
|---|---|---|
| 1,469,383 | Crowley | Oct. 2, 1923 |
| 1,489,823 | Crowley | Apr. 8, 1924 |
| 1,670,167 | Reece | May 15, 1928 |
| 1,818,205 | Drake | Aug. 11, 1931 |
| 1,872,699 | Drake | Aug. 23, 1932 |
| 2,777,254 | Siefert et al. | Jan. 15, 1957 |
| 2,911,759 | Pilkington et al. | Nov. 10, 1959 |

FOREIGN PATENTS

| 635,934 | France | Jan. 3, 1928 |
|---|---|---|
| 782,149 | Great Britain | Sept. 4, 1957 |